United States Patent
Wang

(10) Patent No.: US 9,483,382 B2
(45) Date of Patent: Nov. 1, 2016

(54) DATA SYNCHRONIZATION METHOD AND APPARATUS

(71) Applicant: Huawei Technologies Co., Ltd., Shenzhen (CN)

(72) Inventor: Zhenguo Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 14/143,143

(22) Filed: Dec. 30, 2013

(65) Prior Publication Data

US 2014/0122934 A1     May 1, 2014

Related U.S. Application Data

(63) Continuation of application No. PCT/CN2012/080459, filed on Aug. 22, 2012.

(30) Foreign Application Priority Data

Aug. 22, 2011 (CN) .......................... 2011 1 0241677

(51) Int. Cl.
*G06F 11/00* (2006.01)
*G06F 11/36* (2006.01)
(Continued)

(52) U.S. Cl.
CPC ............. *G06F 11/3636* (2013.01); *G06F 8/65* (2013.01); *G06F 9/30087* (2013.01);
(Continued)

(58) Field of Classification Search
CPC .. G06F 11/079; G06F 11/36; G06F 11/3636; G06F 9/30145; G06F 9/30087; G06F 9/45558; G06F 8/65; G06F 12/0815

USPC ........... 714/35, 25, 34, 38.1, 38.13, 41, 47.1
See application file for complete search history.

(56) References Cited

U.S. PATENT DOCUMENTS 6,732,363 B1 * 5/2004 Chaudhry ............... G06F 9/542
                                                                           719/310
8,117,600 B1 * 2/2012 Roeck ................. G06F 11/3632
                                                                           714/38.1

(Continued)

FOREIGN PATENT DOCUMENTS

| CN | 1447275 A | 10/2003 |
|---|---|---|
| CN | 101944041 A | 1/2011 |
| CN | 102436366 A | 5/2012 |

OTHER PUBLICATIONS

Foreign Communication From A Counterpart Application, European Application No. 12826093.2, Extended European Search Report dated Jul. 1, 2014, 6 pages.
(Continued)

*Primary Examiner* — Joseph D Manoskey
(74) *Attorney, Agent, or Firm* — Conley Rose, P.C.; Grant Rodolph; Adam J. Stegge

(57) ABSTRACT

Embodiments of the present invention provide a data synchronization method and apparatus. The method includes: scanning a code to capture a synchronization instruction; replacing the captured synchronization instruction with a trap instruction; and when the code runs to the trap instruction, trapping a code execution right into a distributed shared memory (DSM) unit, where the DSM unit implements a concurrent multi-write protocol, but implements a single-write protocol when executing the synchronization instruction, thereby supporting the concurrent multi-write protocol and solving the synchronization problem caused by the concurrent multi-write protocol.

20 Claims, 4 Drawing Sheets

(51) Int. Cl.
  *G06F 9/30* (2006.01)
  *G06F 11/07* (2006.01)
  *G06F 12/08* (2016.01)
  *G06F 9/455* (2006.01)
  *G06F 9/445* (2006.01)

(52) U.S. Cl.
  CPC ...... *G06F 9/30145* (2013.01); *G06F 9/45558* (2013.01); *G06F 11/079* (2013.01); *G06F 11/36* (2013.01); *G06F 12/0815* (2013.01)

(56) References Cited

U.S. PATENT DOCUMENTS

| | | |
|---|---|---|
| 2003/0191906 A1 | 10/2003 | Chen et al. |
| 2004/0230975 A1 | 11/2004 | Gewirtz et al. |
| 2005/0039180 A1 | 2/2005 | Fultheim et al. |
| 2011/0004732 A1* | 1/2011 | Krakirian ............ G06F 12/0817 711/147 |

OTHER PUBLICATIONS

Chapman, M., et al., "vNUMA: A Virtual Shared-Memory Multi-processor," Open Kernel Labs, Proceedings of the 2009 conference on USENIX Annual technical conference, 2009, 14 pages.

Zekauskas, M. J., et al., "Software Write Detection for a Distributed Shared Memory," OSDI' 94 Proceedings of the 1st USENIX Conference on Operating Systems Design and Implementation, Dec. 31, 1994, 14 pages.

Foreign Communication From a Counterpart Application, PCT Application No. PCT/CN2012/080459, English Translation of Chinese Search Report dated Dec. 6, 2012, 2 pages.

Foreign Communication From a Counterpart Application, PCT Application No. PCT/CN2012/080459, English Translation of Chinese Written Opinion dated Dec. 6, 2012, 11 pages.

Foreign Communication From a Counterpart Application, Chinese Application No. 201110241677.0, Chinese Office Action dated Feb. 20, 2014, 7 pages.

Foreign Communication From a Counterpart Application, Chinese Application No. 201110241677.0, Chinese Office Action dated Jun. 27, 2013, 7 pages.

Foreign Communication From a Counterpart Application, Chinese Application No. 201110241677.0, Chinese Office Action dated Dec. 12, 2013, 7 pages.

Partial English Translation and Abstract of Chinese Patent Application No. CN101944041A, Jan. 15, 2014, 5 pages.

* cited by examiner

DATA SYNCHRONIZATION METHOD AND APPARATUS

CROSS-REFERENCE TO RELATED APPLICATIONS

This application is a continuation of International Application No. PCT/CN2012/080459, filed on Aug. 22, 2012, which claims priority to Chinese Patent Application No. 201110241677.0, filed on Aug. 22, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the data processing field, and in particular, to a data synchronization method and apparatus.

BACKGROUND

Memory coherency is a key technology in a multiprocessor system, and in particular, in the competitive high-end server field, an efficient memory coherency protocol and its implementation are a key factor that determines performance of a high-end server. In key service fields such as banks, securities, governments, or enterprises, the high-end server is an inevitable choice.

By using a high-speed interconnect chip and an efficient interconnect topology structure and with the support of an extensible protocol, a memory-coherent multiprocessor system implemented by hardware basically dominates the entire server market. However, high performance implemented by hardware is also accompanied by a high price. A memory-coherent multiprocessor system implemented by software is limited by communication delays and subject to the constraint of a coherency module, and therefore, an efficient memory-coherent multiprocessor system can hardly be implemented.

By means of virtualization, multiple processor systems are virtualized into a large Symmetrical Multi-Processing (SMP) system provided for an operating system, and hence a memory-coherent multiprocessor system is implemented by software.

In the foregoing solution, a trap into a virtual machine monitor (VMM) is implemented by using an exception, interruption, and the like by using a memory coherency policy and a related interface based on a write-invalidate operation. However, the solution does not support a concurrent multi-write protocol.

In some scenarios, the concurrent multi-write protocol can reduce Central Processing Unit (CPU) usage by about 50% as compared with a write-invalidate protocol. Therefore, the memory coherency protocol supporting concurrent multi-write can virtualize non-coherent memory access in the system to achieve higher efficiency. However, concurrent multi-write of data may cause corresponding data to be out of synchronization between nodes.

SUMMARY

Embodiments of the present invention provide a data synchronization method and apparatus, which can solve the synchronization problem caused by the memory coherency protocol supporting concurrent multi-write.

In one aspect, a data synchronization method is provided, including: scanning, by a code scanning unit, a code to capture a synchronization instruction; replacing, by the code scanning unit, the captured synchronization instruction with a trap instruction; and when the code runs to the trap instruction, obtaining, by a distributed shared memory (DSM) unit, a code execution right, where the DSM unit implements a concurrent multi-write protocol, but implements a single-write protocol when executing the synchronization instruction.

In another aspect, a data synchronization apparatus is provided, including: a code scanning unit configured to scan a code to capture a synchronization instruction, and replace the captured synchronization instruction with a trap instruction; and a DSM unit configured to obtain a code execution right when the code runs to the trap instruction, where the DSM unit implements a concurrent multi-write protocol, but implements a single-write protocol when executing the synchronization instruction.

In another aspect, a data processing system is provided, including: an operating system and the foregoing data synchronization apparatus that runs under the operating system.

In the embodiments of the present invention, pre-scanning is performed before execution of a code, and a synchronization instruction that may affect data synchronization is replaced with a trap instruction, so that when the code runs to the trap instruction, a code execution right is trapped into a DSM unit, where the DSM unit implements a concurrent multi-write protocol, but implements a single-write protocol when executing the synchronization instruction, thereby supporting the concurrent multi-write protocol and solving the synchronization problem caused by the concurrent multi-write protocol.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to a multiprocessor system. Embodiments of the present invention are described by using an Intel x86 CPU architecture as an example, but the embodiments of the present invention are not limited to the Intel x86 architecture, and other CPU architectures supporting a Total Store Ordering (TSO) synchronization model may also be included. In addition, the solutions of the present invention may be applied to a virtualized application.

In a distributed memory-coherent system, a code includes synchronization instructions required by a memory coherence model, for example, sensitive instructions such as atomic operation and memory barrier instructions. When the distributed memory-coherent system supports a concurrent multi-write memory coherency protocol, the synchronization instructions cause problems to data synchronization, for example, problems such as data out-of-synchronization. The synchronization instructions according to the embodiments of the present invention are not limited to the above particular terms, for example, the synchronization instructions may further include other forms of instructions that may affect data synchronization, for example, lock prefix instructions (composed of a series of atomic operations), and so on.

Figure 1:
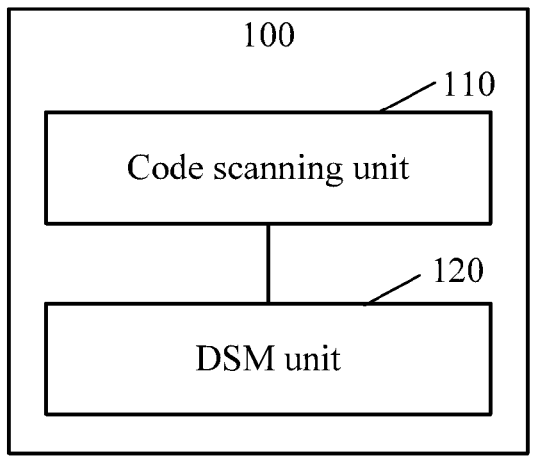
FIG. 1 is a block diagram of a data synchronization apparatus according to an embodiment of the present invention.

FIG. 1 is a block diagram of a data synchronization apparatus according to an embodiment of the present invention. A data synchronization apparatus 100 includes a code scanning unit 110 and a DSM unit 120.

The code scanning unit 110 scans a code to capture a synchronization instruction, and replaces the captured synchronization instruction with a trap instruction.

Optionally, according to an embodiment, the code scanning unit 110 may scan a code by using a page as a unit. The scanned code may be any code executed in an operating system or an application program. The scanning operation of the code scanning unit 110 may be triggered after a new program or virtual machine is loaded and before execution of a jump routine or virtual machine context, or may also be triggered by other components, for example, the DSM unit 120 calls the code scanning unit 110 to perform a scanning operation.

The DSM unit 120 obtains a code execution right when the code runs to the trap instruction, where the DSM unit implements a concurrent multi-write protocol, but implements a single-write protocol when executing the synchronization instruction.

In the embodiments of the present invention, pre-scanning is performed before execution of a code, and a synchronization instruction that may affect data synchronization is replaced with a trap instruction, so that when the code runs to the trap instruction, a code execution right is trapped into a DSM unit, where the DSM unit implements a concurrent multi-write protocol, but implements a single-write protocol when executing the synchronization instruction, thereby supporting the concurrent multi-write protocol and solving the synchronization problem caused by the concurrent multi-write protocol.

Optionally, according to another embodiment of the present invention, the code scanning unit 110 further scans the code to capture a flow change instruction, for example, instructions such as jump, call, and call return, and replaces the flow change instruction with the trap instruction. The flow change instruction may cause the code to execute a corresponding code on another page. Assuming that the corresponding code is also a synchronization instruction, data synchronization may be affected. Therefore, in the embodiment of the present invention, the flow change instruction may be replaced with a trap instruction, and the DSM unit 120 implements an indirect jump, preventing the synchronization problem arising from this.

For example, when executing the flow change instruction, the DSM unit 120 determines whether a target page to which a flow change is directed is a scanned page. When the target page to which the flow change is directed is a scanned page, the flow change is executed to a corresponding code on the scanned page, and the corresponding code is executed; and when the target page to which the flow change is directed is an unscanned page, the code scanning unit 110 is called to execute, for the unscanned page, the code scanning to capture a synchronization instruction and replace the captured synchronization instruction with a trap instruction.

Optionally, according to an embodiment of the present invention, if the synchronization instruction is a memory barrier instruction, the DSM unit 120 may return the code execution right after all data update operations are completed.

Optionally, according to an embodiment of the present invention, if the synchronization instruction is an atomic operation instruction, the DSM unit 120 may broadcast a notification to other nodes, so that the other nodes set corresponding data to read-only and forbid synchronization operations for the corresponding data; and after execution of the atomic operation instruction is completed, broadcast updated data to the other nodes, so that the other nodes update the corresponding data and allow synchronization operations for the corresponding data.

Further, according to another embodiment of the present invention, in addition to the trap instruction, the DSM unit 120 obtains the code execution right when a page fault occurs in the code execution process.

For example, if the page fault is caused by a read operation, the DSM unit 120 generates a copy of data to which the read operation is directed, and causes other nodes to set corresponding copies on the other nodes to read-only. If the page fault is caused by a write operation, then, when a page to which the write operation is directed does not exist, the DSM unit 120 requests a cache, and writes data to the cache, or when a page to which the write operation is directed exists, the DSM unit 120 updates data, and broadcasts the updated data and updated global time to the other nodes, so that the other nodes update corresponding data according to the global time.

Optionally, the data synchronization apparatus 100 may run in the operating system or application program. Thereby, it is unnecessary to modify the operating system or application program, so that the apparatus has good universal applicability.

Or, the data synchronization apparatus 100 may also be included in the operating system. In this case, the operating system needs to be implemented by modifying source codes of synchronization instructions such as memory barrier and atomic operation instructions, and the interface provided by the DSM unit is used for replacement, but it is easy to implement this minor modification.

Optionally, according to an embodiment of the present invention, the concurrent multi-write protocol is a write update protocol.

In the embodiment of the present invention, by using a software scanning mode, a synchronization instruction is captured before code execution, and a synchronization instruction trap request is processed based on the memory coherency protocol, so that a multi-write and multi-read protocol is supported. For example, in a multiprocessor system based on a synchronization model, an update operation for shared data is captured by software (by using a page fault and trap instruction), and the update operation is broadcast to instruct other processors to update corresponding caches. For capturing of the trap instruction, all update operations may be synchronized, pending the end of the update operations. Therefore, the concurrent multi-write protocol can be supported, and the synchronization problem caused by the concurrent multi-write protocol is solved.

Figure 2:
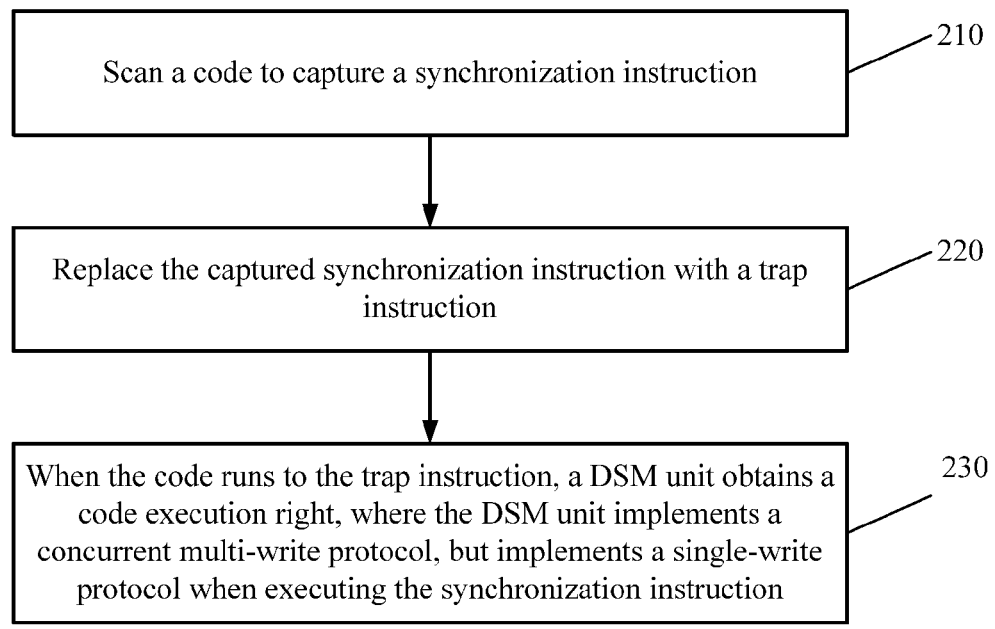
FIG. 2 is a flowchart of a data synchronization method according to an embodiment of the present invention.

The above describes the data synchronization apparatus according to the embodiment of the present invention; the following describes a data synchronization method with reference to FIG. 2 according to an embodiment of the present invention.

FIG. 2 is a schematic flowchart of a data synchronization method according to an embodiment of the present invention. The method in FIG. 2 may be executed by the data synchronization apparatus 100 shown in FIG. 1.

210. Scan a code to capture a synchronization instruction.

For example, a code scanning unit 110 of a data synchronization apparatus 100 may execute step 210. As described above, the code scanning unit 110 may scan the code after a new program or virtual machine is loaded or before execution of a jump routine or virtual machine context or when a program jumps to an unscanned code page, so as to identify synchronization instructions such as atomic operation and memory barrier instructions.

220. Replace the captured synchronization instruction with a trap instruction.

For example, when the code scanning unit 110 scans a synchronization instruction such as an atomic operation and/or memory barrier instruction, the synchronization instruction is replaced with a trap instruction. In the embodiment of the present invention, replacing the synchronization instruction with a trap instruction also includes the case of adding a trap instruction before the synchronization instruction.

230. When the code runs to the trap instruction, a DSM unit obtains a code execution right, where the DSM unit implements a concurrent multi-write protocol, but implements a single-write protocol when executing the synchronization instruction.

When an operating system or an application program executes a code, and when the code runs to the trap instruction, the code execution right is trapped into the DSM unit, that is, the DSM unit obtains the code execution right from the operating system or application program and executes the replaced synchronization instruction.

For example, in the case that the code execution right is trapped into the DSM unit due to a memory barrier instruction, the DSM unit may check whether a request waiting for a remote update response exists on a local node, and if the request exists, waits for an end of the request, if the request does not exist, jumps to an instruction next to the memory barrier instruction for processing. If the code execution right is trapped into the DSM unit due to an atomic write operation, the DSM unit sends a remote write update to a remote node, and then continues execution after the remote node returns a response of the remote write update.

In the embodiments of the present invention, pre-scanning is performed before execution of a code, and a synchronization instruction that may affect data synchronization is replaced with a trap instruction, so that when the code runs to the trap instruction, a code execution right is trapped into a DSM unit, where the DSM unit implements a concurrent multi-write protocol, but implements a single-write protocol when executing the synchronization instruction, thereby supporting the concurrent multi-write protocol and solving the synchronization problem caused by the concurrent multi-write protocol.

Optionally, according to another embodiment of the present invention, the code may be scanned to capture a flow change instruction, and the flow change instruction is replaced with the trap instruction. For example, the code may further include flow change instructions that change a program instruction flow, such as jump, call, and call return, where the target pages to which the instructions are directed may also include synchronization instructions such as atomic operation and memory barrier instructions. To avoid the synchronization problem caused by the jump or call of a new page, the flow change instruction may also be replaced with a trap instruction, so that the code execution right may be trapped into the DSM unit to perform an indirect jump. If necessary, the code scanning unit is called to scan the target page of the flow change.

Specifically, when executing the flow change instruction, the DSM unit determines whether a target page to which the flow change is directed is a scanned page. When the target page to which the flow change is directed is a scanned page, the flow change is executed to a corresponding code on the scanned page, and the corresponding code is executed. When the target page to which the flow change is directed is an unscanned page, processes in steps 210 and 220 are executed for the unscanned page, and the corresponding code on the page continues to be executed after the scanning.

Optionally, according to an embodiment of the present invention, if the synchronization instruction is a memory barrier instruction, in step 230, the DSM unit returns the code execution right after all data update operations are completed.

Optionally, according to another embodiment of the present invention, if the synchronization instruction is an atomic operation instruction, in step 230, a notification is broadcast to other nodes, so that the other nodes set corresponding data to read-only and forbid synchronization operations for the corresponding data; and after execution of the atomic operation instruction is completed, updated data is broadcast to the other nodes, so that the other nodes update the corresponding data and allow synchronization operations for the corresponding data.

Further, according to another embodiment of the present invention, the DSM unit may further obtain the code execution right when a page fault occurs in the code execution process.

If the page fault is caused by a read operation, the DSM unit generates a copy of data to which the read operation is directed, and causes other nodes to set corresponding copies on the other nodes to read-only. If the page fault is caused by a write operation, then, when a page to which the write operation is directed does not exist, the DSM unit requests a cache, and writes data to the cache; when a page to which the write operation is directed exists, the DSM unit updates data, and broadcasts the updated data and updated global time to the other nodes, so that the other nodes update corresponding data according to the global time.

Optionally, according to an embodiment of the present invention, the concurrent multi-write protocol is a write update protocol.

The following describes the embodiments of the present invention in more detail with reference to specific examples.

Figure 3:
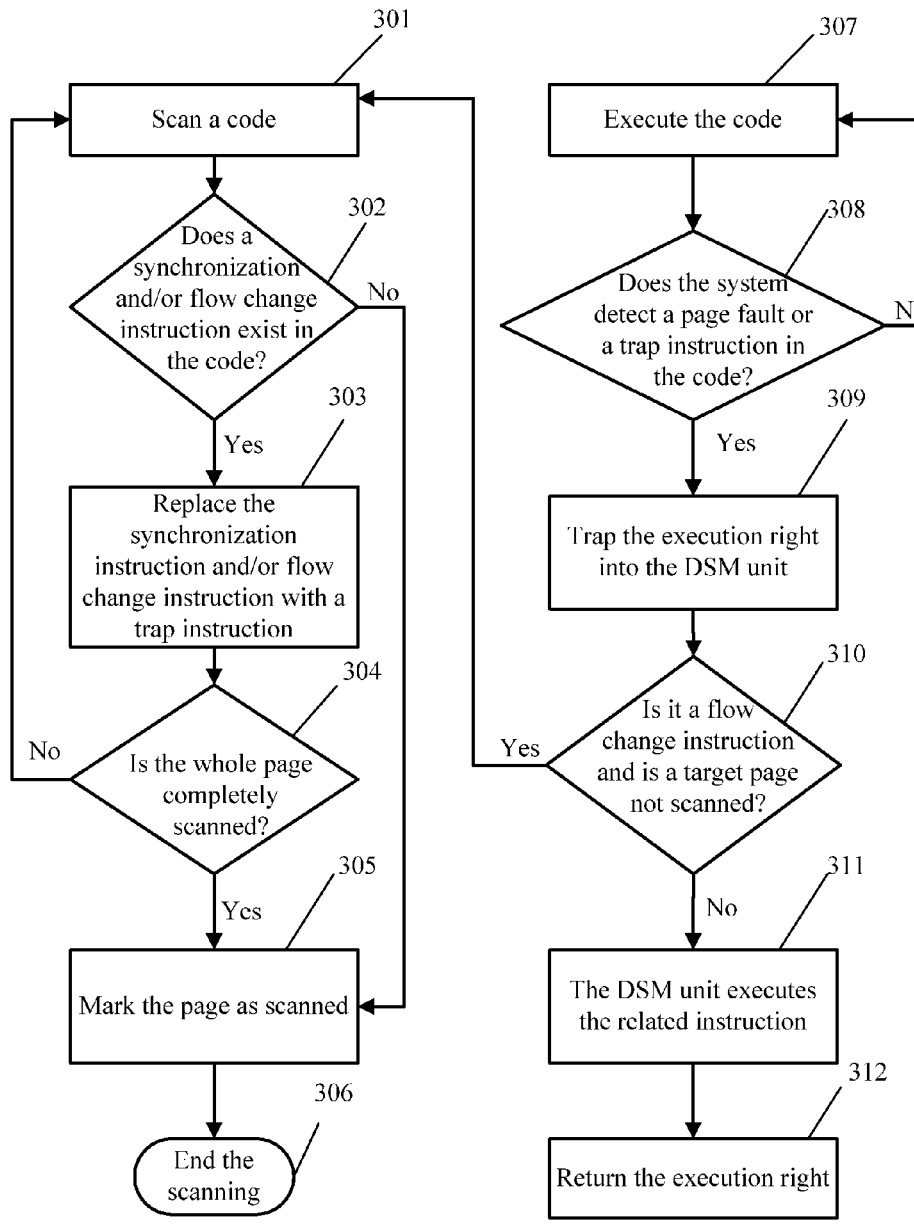
FIG. 3 is a schematic flowchart of an example of a data synchronization process according to an embodiment of the present invention.

FIG. 3 is a schematic flowchart of an example of a data synchronization process according to an embodiment of the present invention.

Code pre-scanning is performed first. The process of code pre-scanning includes the following steps 301-306.

301. Scan a code. For example, the above code scanning unit may scan the code after a new program or virtual machine is loaded or before execution of a jump routine or virtual machine context or when a program jumps to an unscanned code page, so as to identify synchronization instructions such as atomic operation and memory barrier instructions and/or flow change instructions. According to an embodiment of the present invention, the granularity of scanning may be the size of a physical page frame in a system architecture.

302. Determine whether a synchronization and/or flow change instruction exists in the code. If such an instruction exists, execute step 303; otherwise, execute step 305.

303. When it is determined that a synchronization and/or flow change instruction exists in the code, replace the synchronization instruction and/or flow change instruction with a trap instruction.

304. Determine whether the whole page is completely scanned. If yes, execute step 305; otherwise, execute step 301 again.

305. When the whole page is completely scanned, mark the page as scanned. Herein, whether a dirty bit of the page is set may be further determined, and if yes, it indicates that data on the page is modified, the page is a temporary code page, and the page needs to be scanned again. Therefore, step 301 is also executed again.

306. End the scanning.

After the code pre-scanning process in steps 301 to 306 is executed, the following steps 307 to 311 may be executed, so that the code is executed and a trap operation is implemented in the case of meeting a trap instruction.

307. Execute the code. For example, a system may execute the code by using a physical page as a unit.

308. The system detects whether there is a page fault or whether there is a trap instruction in the code. If there is a page fault or there is a trap instruction in the code, execute step 309; otherwise, execute step 307. For example, if a write update protocol is used based on a TSO synchronization model, usually there are two types of traps: a trap in the case of meeting a page fault and a trap in the case of meeting a trap instruction. For example, in the process of executing the code, if a trap instruction is met, the code execution right is trapped into the DSM unit; otherwise, the code continues to be executed. In addition, if the system detects a page fault, the code execution right is trapped into the DSM unit.

309. Trap the code execution right into the DSM unit. For example, when the system detects a trap in the case of a page fault or meets a trap instruction when executing the code, the operating system or application program may transfer the code execution right to the DSM unit, that is, the code execution right is trapped into the DSM unit, and the DSM unit executes the related code.

310. If the related code executed by the DSM unit is a flow change instruction and a target page is not scanned, execute steps 301-306, and call the code scanning unit to perform code pre-scanning for the target page. Otherwise, execute step 311.

Specifically, after the trap into the DSM unit, if the DSM unit meets a flow change instruction (for example, an instruction that changes a program instruction flow such as jump, call, and return) in the code execution process, a scanning system service program may be called to perform an indirect jump. The service program determines, according to dynamic address information during execution, whether the page to which the jump is directed is a scanned page, and if yes, the service program directly jumps to the corresponding code for execution; otherwise, initiates a new round of scanning.

311. The DSM unit executes the related code, for example, the synchronization instruction or the instruction corresponding to the target page (scanned) of the flow change. The DSM unit implements a concurrent multi-write protocol, but implements a single-write protocol when executing the synchronization instruction.

In the case of a page fault, if the page fault is caused by a read operation, a copy of remote memory data is copied to a local, and all copies are changed to read-only. If the page fault is caused by a write operation, when the page of the data does not exist, a cache is requested, and the data is used for initialization; if the page exists, the corresponding data on the page is updated, and then global time and content for modifying a data segment is broadcast to other nodes, and the execution right is returned to the operating system. After receiving the updated write data, the other nodes execute comparison of global times; if the global time is later than the global time recently updated in the corresponding data on the nodes, the other nodes update the corresponding data on the nodes; otherwise, the other nodes do not update the corresponding data on the nodes. The other nodes may return an update acknowledgement.

In the case of a synchronization instruction, if the synchronization instruction is a memory barrier instruction, the execution right is returned to the operating system after all concurrent multi-write operations are completed. If the synchronization instruction is an atomic operation instruction and the like, a notification is broadcast to each node. The corresponding data on other nodes is set to read-only, and the synchronization operation for the data is forbidden. Afterward, the DSM unit executes the synchronization instruction such as the atomic operation instruction, and broadcasts the updated data to the other nodes after completion of execution. After receiving the information, the other nodes update data, and allow the synchronization operation for the data. Thereby, a single-write protocol is implemented during execution of the synchronization instruction, and the problem of data out-of-synchronization is avoided.

312. The DSM unit returns the execution right to the operating system or application program. For example, the DSM unit transfers the code execution right to the operating system or application program after executing the code replaced with the trap instruction or processing the page fault.

In addition, before returning the execution right to the operating system or application program, the DSM unit may determine whether the page where the value of an entry point (eip or rip in x86) of its instruction is located is scanned; if the page is not scanned, the DSM unit calls the code scanning unit to execute the code pre-scanning process (steps 301-306). The DSM unit may further determine whether the dirty bit of the page is set, and if yes, it indicates that the data on the page is modified, and the page is a temporary code page. The DSM unit calls the code scanning unit to re-execute the code pre-scanning process and rescans the page.

Figure 4:
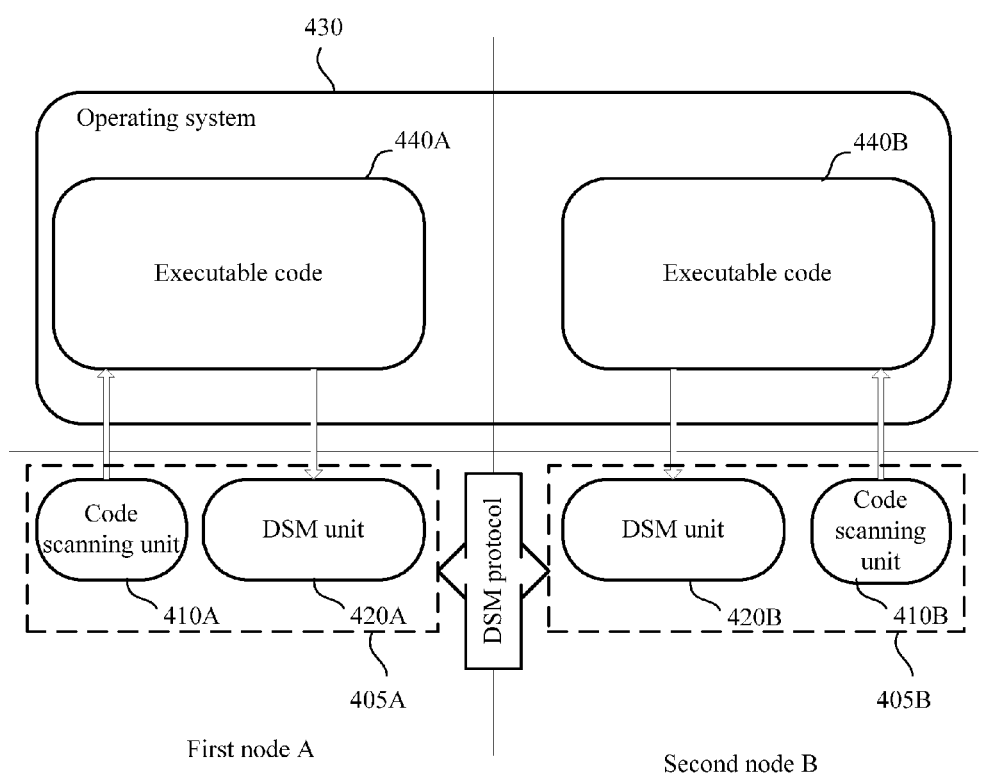
FIG. 4 is a schematic architecture diagram of a data synchronization process according to an embodiment of the present invention.
Figure 5:
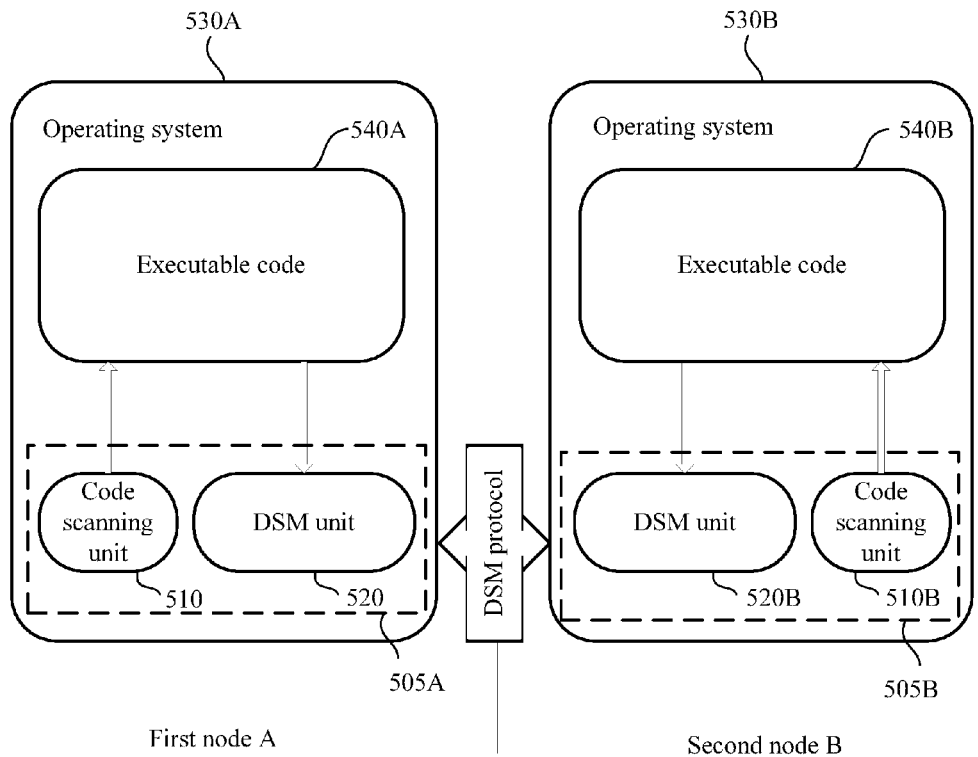
FIG. 5 is a schematic architecture diagram of a data synchronization system according to an embodiment of the present invention.

The above describes the data synchronization apparatus and data synchronization method according to the embodiments of the present invention; the following describes a data synchronization system with reference to FIG. 4 and FIG. 5 according to the embodiments of the present invention.

FIG. 4 is a schematic architecture diagram of a data synchronization system according to an embodiment of the present invention. The data synchronization system may include multiple nodes. Although FIG. 4 exemplifies only a first node A and a second node B, the embodiments of the present invention are not limited thereto, and the data synchronization system of the present invention may include more nodes.

As shown in FIG. 4, the first node A and second node B jointly use an operating system 430. The operating system 430 includes an executable code 440A on the first node A and an executable code 440B on the second node B. In addition, as shown in the dotted block of FIG. 4, the first node A includes a data synchronization apparatus 405A formed by a code scanning unit 410A and a DSM unit 420A; the second node B includes a data synchronization apparatus 405B formed by a code scanning unit 410B and a DSM unit 420B. In the following description, if distinguishing is not required, the code scanning units 410A and 410B are collectively referred to as a code scanning unit 410, or the DSM units 420A and 420B are collectively referred to as a DSM unit 420, or the executable codes 440A and 440B are collectively referred to as an executable code 440. The operating system 430 or application program runs on the code scanning unit 410 and DSM unit 420.

The data synchronization apparatuses 405A and 405B are similar to the data synchronization apparatus 100 in FIG. 1, and may execute the method shown in FIG. 2 or FIG. 3, which is not further described herein for avoiding repetition.

For example, the code scanning unit 410 scans the executable code 440 to capture synchronization instructions such as atomic operation and memory barrier instructions and/or flow change instructions, and replaces the captured synchronization instructions and/or flow change instructions with a trap instruction, so that when the executable code runs to the trap instruction, the code execution right is trapped into the DSM unit 420 to execute the replaced synchronization instructions and/or flow change instructions.

The DSM unit 420 implements a concurrent multi-write protocol, and when meeting the synchronization instructions such as the atomic operation and memory barrier instructions, the protocol implemented by the DSM unit 420 changes from a multi-write protocol into a single-write protocol; after the DSM unit 420 implements the synchronization instructions, the protocol may recover to a concurrent multi-write protocol. The DSM unit 420 may run at a privilege level; when the execution right is trapped into the DSM unit 420, the execution right is transferred from the operating system 430 or application program to the DSM unit 420; the DSM unit 420 returns the execution right to the operating system 430 or application program after executing the corresponding operation.

The data synchronization apparatuses 405A and 405B may perform data synchronization operations through a DSM protocol. When other nodes are required to perform operations, for example, in the case of broadcasting updated data or forbidding other nodes to perform synchronization operations for the corresponding data, the other nodes perform interaction with each other through the DSM protocol.

According to the embodiment of the present invention, to improve universal applicability and performance of a DSM system, a code scanning method is used to transparently support synchronization instructions such as memory barrier instructions in the operating system and application program and implement a concurrent multi-write protocol.

In addition, the data synchronization apparatus in this embodiment runs under the operating system or application program. Thereby, it is unnecessary to modify the operating system or application program, so that the apparatus has good universal applicability.

FIG. 5 is a schematic architecture diagram of a data synchronization system according to an embodiment of the present invention. The embodiment in FIG. 5 is different from the embodiment in FIG. 4 in that the data synchronization apparatus in FIG. 5 is included in the operating system. In FIG. 5, the parts which are the same as or similar to those in FIG. 4 are indicated by similar reference numbers, and are described in brief.

As shown in FIG. 5, the operating system 530A on the first node A includes an executable code 540A, a code scanning unit 510A, and a DSM unit 520A. The code scanning unit 510A and DSM unit 520A form a data synchronization apparatus 505A. The operating system 530B on the second node B may include an executable code 540B, a code scanning unit 510B, and a DSM unit 520B. The code scanning unit 510B and DSM unit 520B form a data synchronization apparatus 505B.

The data synchronization apparatuses 505A and 505B are similar to the data synchronization apparatus 100 in FIG. 1, and may execute the method shown in FIG. 2 or FIG. 3, which is not further described herein for avoiding repetition.

For example, the data synchronization apparatuses 505A and 505B may perform data synchronization operations through the DSM protocol. When other nodes are required to perform operations, for example, in the case of broadcasting updated data or forbidding other nodes to perform synchronization operations for the corresponding data, the other nodes perform interaction with each other through the DSM protocol.

It should be noted that: in the implementation of this embodiment, the operating systems 530A and 530B need to be implemented by modifying source codes of synchronization instructions such as the memory barrier and atomic operation instructions, and the interface provided by the DSM unit is used for replacement, but it is easy to implement this minor modification.

Figure 6:
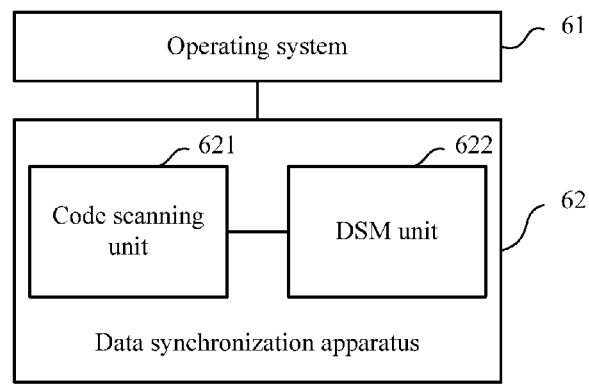
FIG. 6 is a block diagram of a data processing system according to an embodiment of the present invention.

FIG. 6 is a block diagram of a data processing system according to an embodiment of the present invention. The data processing system in FIG. 6 includes an operating system 61 and a data synchronization apparatus 62 running in the operating system 61.

The data synchronization apparatus 62 includes a code scanning unit 621 and a DSM unit 622. The code scanning unit 621 scans a code to capture a synchronization instruction, and replaces the captured synchronization instruction with a trap instruction. The DSM unit 622 obtains a code execution right from the operating system 61 when the code runs to the trap instruction, where the DSM unit implements a concurrent multi-write protocol, but implements a single-write protocol when executing the synchronization instruction.

In the embodiments of the present invention, pre-scanning is performed before execution of a code, and a synchronization instruction that may affect data synchronization is replaced with a trap instruction, so that when the code runs to the trap instruction, a code execution right is trapped into a DSM unit, where the DSM unit implements a concurrent multi-write protocol, but implements a single-write protocol when executing the synchronization instruction, thereby supporting the concurrent multi-write protocol and solving the synchronization problem caused by the concurrent multi-write protocol.

In addition, an example of the data processing system in FIG. 6 is a node shown in FIG. 4; the data synchronization apparatus 62 runs under the operating system 61, and it is unnecessary to modify an existing operating system, so that the apparatus has good universal applicability.

An example of the data synchronization apparatus 62 is the data synchronization apparatus 100 shown in FIG. 1, and the apparatus may execute each step in the method embodiments shown in FIG. 2 and FIG. 3, which is not further described herein for avoiding repetition.

According to the embodiments of the present invention, a high-performance memory-coherent multiprocessor system implemented by hardware is introduced; a cheap server or workstation is integrated by software to form a high-performance and low-price high-end server system, which solves the synchronization problem caused by reasons such as the memory barrier instruction in the concurrent multi-write protocol in a distributed memory-coherent system; in addition, the operating system or application program provided by an operating system vendor is supported and can run without any modification or with minor modifications, which improves universal applicability of the distributed memory-coherent system.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, reference may be made to the corresponding processes in the foregoing method embodiments for the detailed working processes of the foregoing system, apparatus, and unit, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a universal serial bus (USB) flash disk, a removable hard disk, a read-only memory (ROM), a random access memory (RAM), a magnetic disk, or an optical disk.

The foregoing description is merely about specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data synchronization method, comprising:
scanning, by a code scanning unit, a code to capture a synchronization instruction, wherein the synchronization instruction is a memory barrier instruction;
replacing, by the code scanning unit, the captured synchronization instruction with a trap instruction;
obtaining, by a distributed shared memory (DSM) unit, a code execution right when the code runs to the trap instruction;
implementing, by the DSM unit, a concurrent multi-write protocol;
implementing, by the DSM unit, a single-write protocol when executing the synchronization instruction; and
returning, by the DSM unit, the code execution right after all data update operations are completed.

2. The method according to claim 1, wherein before the code runs to the trap instruction, the method further comprises:
scanning, by the code scanning unit, the code to capture a flow change instruction; and
replacing the flow change instruction with the trap instruction.

3. The method according to claim 2, further comprising:
determining, by the DSM unit, whether a target page to which a flow change is directed is a scanned page when executing the flow change instruction;
executing the flow change to a corresponding code on the scanned page when the target page to which the flow change is directed is the scanned page, and executing the corresponding code; and
executing, for an unscanned page when the target page to which the flow change is directed is the unscanned page, the process of scanning the code to capture the synchronization instruction and the process of replacing the captured synchronization instruction with the trap instruction.

4. The method according to claim 1, further comprising obtaining, by the DSM unit, the code execution right when a page fault occurs in a running process of the code.

5. The method according to claim 4, further comprising:
generating, by the DSM unit, a copy of data to which a read operation is directed when the page fault is caused by the read operation, and causing other nodes to set corresponding copies on the other nodes to read-only;
requesting, by the DSM unit, a cache, and writing data to the cache when the page fault is caused by a write operation and a page to which the write operation is directed does not exist; and
updating, by the DSM unit, data, and broadcasting the updated data and updated global time to the other nodes such that the other nodes update corresponding data according to the global time when the page fault is caused by the write operation and a page to which the write operation is directed exists.

6. The method according to claim 1, wherein the concurrent multi-write protocol is a write-update protocol.

7. A data synchronization apparatus, comprising:
a memory storing executable instructions; and
processor coupled to the memory, wherein the executable instructions cause the processor to:
scan a code to capture a synchronization instruction, wherein the synchronization instruction is a memory barrier instruction;
replace the captured synchronization instruction with a trap instruction;
obtain a code execution right when the code runs to the trap instruction;
implement a concurrent multi-write protocol;
implement a single-write protocol when executing the synchronization instruction; and
return the code execution right after all data update operations are completed.

8. The apparatus according to claim 7, wherein the processor is further configured to:
scan the code to capture a flow change instruction; and
replace the flow change instruction with the trap instruction.

9. The apparatus according to claim 8, wherein the processor is further configured to:
determine whether a target page to which a flow change is directed is a scanned page when executing the flow change instruction;
execute the flow change to a corresponding code on the scanned page when the target page to which the flow change is directed is the scanned page, and execute the corresponding code; and
execute, for an unscanned page when the target page to which the flow change is directed is the unscanned page, the process of scanning the code to capture the synchronization instruction and the process of replacing the captured synchronization instruction with the trap instruction.

10. The apparatus according to claim 7, wherein the processor is further configured to obtain the code execution right when a page fault occurs in a running process of the code.

11. The apparatus according to claim 10, wherein the processor is further configured to:
generate a copy of data to which a read operation is directed when the page fault is caused by the read operation, and cause other nodes to set corresponding copies on the other nodes to read-only;
request a cache, and write data to the cache when the page fault is caused by a write operation and a page to which the write operation is directed does not exist; and
update data when the page fault is caused by the write operation and the page to which the write opera directed exists, and broadcast the updated data and updated global time to the other nodes such that the other nodes update corresponding data according to the global time.

12. The apparatus according to claim 7, wherein the apparatus operates in an operating system or an application program or is comprised in an operating system.

13. The apparatus according to claim 7, wherein the concurrent multi-write protocol is a write-update protocol.

14. A data processing system, comprising:
an operating system comprising a data synchronization apparatus,
wherein the data synchronization apparatus comprises:
a memory storing executable instructions; and
a processor coupled to the memory, wherein the executable instructions cause the processor to:
scan a code to capture a synchronization instruction, wherein the synchronization instruction is a memory barrier instruction; and
replace the captured synchronization instruction with a trap instruction;
obtain a code execution right when the code runs to the trap instruction;
implement a concurrent multi-write protocol;
implement a single-write protocol when executing the synchronization instruction; and
return the code execution right after all data update operations are completed.

15. A data synchronization method, comprising:
scanning, by a code scanning unit, a code to capture a synchronization instruction;
replacing, by the code scanning unit, the captured synchronization instruction with a trap instruction;
scanning; by the code scanning unit, the code to capture a flow change instruction;
replacing the flow change instruction with the trap instruction;
obtaining, by a distributed shared memory (DSM) unit, a code execution right when the code runs to the trap instruction;
implementing, by the DSM unit, a concurrent multi-write protocol;
implementing, by the DSM unit, a single-write protocol when executing the synchronization instruction;
determining, by the DSM unit, whether a target page to which a flow change is directed is a scanned page when executing the flow change instruction;
executing the flow change to a corresponding code on the scanned page when the target page to which the flow change is directed is the scanned page, and executing the corresponding code; and
executing, for an unscanned page when the target page to which the flow change is directed is the unscanned page, the process of scanning the code to capture the synchronization instruction and the process of replacing the captured synchronization instruction with the trap instruction.

16. A data synchronization method, comprising:
scanning, by a code scanning unit, a code to capture a synchronization instruction, wherein the synchronization instruction is an atomic operation instruction;
replacing, by the code scanning unit, the captured synchronization instruction with a trap instruction;
obtaining, by a distributed shared memory (DSM unit, a code execution right when the code runs to the trap instruction;
implementing, by the DSM unit, a concurrent multi-write protocol;
implementing, by the DSM unit, a single-write protocol when executing the synchronization instruction, wherein implementing, by the DSM unit, the single-write protocol when executing the synchronization instruction comprises;
broadcasting a notification to other nodes such that the other nodes set corresponding data to read-only and forbid synchronization operations for the corresponding data; and
broadcasting updated data to the other nodes after execution of the atomic operation instruction is completed such that the other nodes update the corresponding data and allow synchronization operations for the corresponding data.

17. A data synchronization method, comprising:
scanning, by a code scanning nit, a code to capture a synchronization instruction;
replacing, by the code scanning unit, the captured synchronization instruction with a trap instruction;
obtaining, by a distributed shared memory (DSM) unit, a code execution right when the code runs to the trap instruction;
implementing, by the DSM unit, a concurrent multi-write protocol;
implementing, by the DSM unit, a single-write protocol when executing the synchronization instruction;
obtaining, by the DSM unit, the code execution right when a page fault occurs in a running process of the code;
generating, by the DSM unit, a copy of data to which a read operation is directed when the page fault is caused by the read operation, and causing other nodes to set corresponding copies on the other nodes to read-only;
requesting, by the DSM unit, a cache, and writing data to the cache when the page fault is caused by a write operation and a page to which the write operation is directed does not exist; and
updating, by the DSM unit, data, and broadcasting the updated data and updated global time to the other nodes such that the other nodes update corresponding data according to the global time when the page fault is caused by the write operation and a page to which the write operation is directed exists.

18. A data synchronization apparatus, comprising:
a memory storing executable instructions; and
a processor coupled to the memory, wherein the executable instructions cause the processor to:
scan a code to capture a synchronization instruction;
replace the captured synchronization instruction with a trap instruction;
scan the code to capture a flow change instruction;
replace the flow change instruction with the trap instruction
obtain a code execution right when the code runs to the trap instruction;
implement a concurrent multi-write protocol;
implement a single-write protocol when executing the synchronization instruction;
determine whether a target page to which a flow change is directed is a scanned page when executing the flow change instruction;
execute the flow change to a corresponding code on the scanned page when the target page to which the flow change is directed is the scanned page, and execute the corresponding code; and
execute, for an unscanned page when the target page to which the flow change is directed is the unscanned page, the process of scanning the code to capture the synchronization instruction and the process of replacing the captured synchronization instruction with the trap instruction.

19. A data synchronization apparatus, comprising:
a memory storing executable instructions; and
a processor coupled to the memory, wherein the executable instructions cause the processor to:
scan a code to capture a synchronization instruction, wherein the synchronization instruction is an atomic operation instruction;
replace the captured synchronization instruction with a trap instruction;
obtain a code execution right when the code runs to the trap instruction;
implement a concurrent multi-write protocol;
implement a single-write protocol when executing the synchronization instruction;
broadcast a notification to other nodes such that the other nodes set corresponding data to read-only and forbid synchronization operations for the corresponding data; and
broadcast updated data to the other nodes after execution of the atomic operation instruction is completed such that the other nodes update the corresponding data and allow synchronization operations for the corresponding data.

20. A data synchronization apparatus, comprising:
a memory storing executable instructions; and
a processor coupled to the memory, wherein the executable instructions cause the processor to:
scan a code to capture a synchronization instruction;
replace the captured synchronization instruction with a trap instruction;
obtain a code execution right when the code runs to the trap instruction;
implement a concurrent multi-write protocol;
implement a single-write protocol when executing the synchronization instruction;
obtain the code execution right when a page fault occurs in a running process of the code;
generate a copy of data to which a read operation is directed when the page fault is caused by the read operation, and cause other nodes to set corresponding copies on the other nodes to read-only;
request a cache, and write data to the cache when the page fault is caused by a write operation and a page to which the write operation is directed does not exist; and
update data when the page fault is caused by the write operation and the page to which the write operation is directed exists, and broadcast the updated data and updated global time to the other nodes such that the other nodes update corresponding data according to the global time.

* * * * *